July 27, 1926.

J. R. MILLWARD 1,594,182

WELDING RAIL JOINTS

Filed May 1, 1925

Inventor

Patented July 27, 1926.

1,594,182

UNITED STATES PATENT OFFICE.

JOHN ROSCOE MILLWARD, OF TENAFLY, NEW JERSEY.

WELDING RAIL JOINTS.

Application filed May 1, 1925. Serial No. 27,212.

This invention relates to the art of welding rail joints and consists of an improved process having for its object to effect substantial economies in the welding operation.

The present process more particularly relates to what may be termed seam or external line welding wherein fusion is effected between adjacent or abutting surfaces of the metal parts to be welded with or without the addition of metal as desired, as distinguished from the well known methods of cast welding. A typical illustration of the type of welding operation to which this invention is directed is that commonly practiced in the welding of splice bars to rails for the securing of rail joints as largely practiced by the street railways. As is well known, the present electric welding processes and oxy-acetylene welding processes in their practice require the use of considerable apparatus and in addition requires the employment of highly skilled labor and the weld produced is dependent largely upon the skill of the operator.

As will be appreciated, an important factor in this type of welding operation is the local application of heat of the required intensity and duration to effect the proper fusion of the metal and desirably to add additional metal to the weld. In accordance with the present invention, the requirements are met in a more uniform and simplified manner by the employment of a mixture such as aluminum-iron oxide and the operation is performed by placing or supporting the combustible mixture in close proximity or in contact with the surfaces to be welded and then igniting. In its preferred form, the combustible mixture may be solidified in the form of a rod of suitable form and dimensions proportionate to the desired weld. The application of heat is thus determined by the combustible mixture and the cross-section of the rod and may accordingly be predetermined in manufacture to produce uniform results and in consequence eliminate the human factor and highly skilled labor as heretofore required to obtain a successful weld.

In carrying out my invention I preferably employ a combustible mixture of aluminum and iron oxide having a suitable binder such as a sodium silicate or a small percentage of rosin and of a form to permit of the rod being ignited by means of a suitable ignition powder which may be in the form of a cartridge. The combustible rod may desirably be of the composition commercially known as railroad thermit where employed for the welding of rail joints as herein illustrated and the rods are so positioned and supported that the reduced ferrous material resulting from the chemical reaction will be added to the fusion weld produced. In accordance with a further feature thereof, there is interposed between the combustible mixture or rod and the surfaces to be welded, ferrous material desirably in the form of steel or iron filings, the function of which is, by its displacement, to keep out the slag and prevent the coating of the surfaces to be welded with slag, thereby to improve the weld produced. The powdered ferrous material further adds to the metallic content of the weld.

My improved process will be more fully understood by reference to the accompanying drawing wherein a typical application thereof is illustrated as applied to the welding of splice bars to rail joints.

Figure 1:
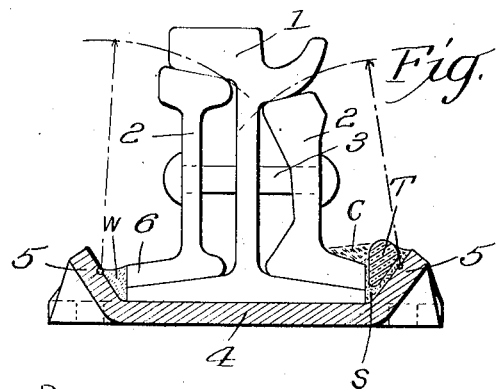
Fig. 1 is a vertical cross-sectional view of a rail joint illustrating diagrammatically the method employed in the welding of the splice bars thereof in accordance with the present invention.

In the figures, 1—1 indicate the meeting rail ends, 2—2 oppositely positioned splice bars having the usual fishing engagement with the rails and secured by the rivets 3. 4 indicates a joint plate underlying the rail ends and splice bars and which, as shown, is of a length to bridge the usual spaced ties and is formed at its opposite sides with longitudinally extending shoulders at 5 produced by bending upwardly the marginal edge portions of the flat plate 4. In the disclosed joint structure, each of the splice bars is secured by a single weld W uniting the flanges 6 of the splice bars with the outer edges of the rail base flange and the shoulder 5 of the base plate; the welds being produced by the improved method now to be described.

In accordance with my invention, the welding is performed by the employment of a combustible mixture of aluminum and iron oxide indicated at T, which is supported in close proximity to the surfaces to be welded with ferrous material S interposed between said surfaces and the combustible mixture as indicated. The combustible mixture and ferrous material are suitably impounded or enclosed within the channel or welding groove formed between the splice bar and rail base flanges and the flange 5 of the base plate by means of suitable refractory material C of powdered fire clay. The combustible mixture is then ignited by means of magnesium or other suitable ignition powder and the resulting reaction will reduce the metallic content to the position of the desired weld as shown at W and will, likewise, effect the fusion of the interposed ferrous material S, which is subjected to the direct heat of the reaction, to add to the weld and to protect the surfaces of the parts to be welded against fouling or coating with slag.

The combustible mixture may be of powdered form, but in accordance with the further feature of my invention is preferably in the form of a solidified rod of uniform cross-sectional area and of a length corresponding to that of the weld to be produced, the mixture being held to the rod form by a suitable binder such as sodium silicate and may desirably be of the cross section as illustrated in Fig. 1. As will be readily understood, the rods comprising the aluminum iron oxide composition with binder may be moulded to form by any of the well known methods such as placing in forming moulds when in a plastic state or by passing through forming rolls when in a semi-plastic condition. The combustible rods may, accordingly, be manufactured under conditions best suited to obtain uniform results and in consequence the nature of the weld may be accurately predetermined in the moulding of the rods which may be varied in their size and composition to meet specific requirements.

The structural form and arrangement of the rail joint disclosed, as will be recognized, contributes to the facility of welding by the improved method as described in that the upturned flanges or shoulders 5 in their relation to the outer edges of the splice bar and rail flanges form a welding channel favorable to properly supporting the welded material in position for welding without the employment of special supporting means therefor. The splice bars, moreover, are of a form whereby the fishing engagement with the underside of the rail head is such as to be secured against lateral displacement by means of the base welds W, as will be understood by reference to the arcs as described.

There is, accordingly, produced an improved method of welding wherein the welding operation is materially simplified by the elimination of the considerable apparatus as heretofore required for seam welding and wherein welds of uniform and predetermined properties may be made independent of the human factor and, in consequence, eliminating the necessity of highly skilled labor.

Figure 4:
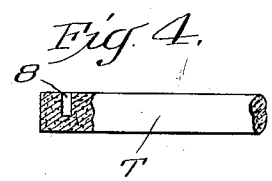
Fig. 4 is a fragmentary view in side elevation showing the combustible rod of suitable molded form.
Figure 2:
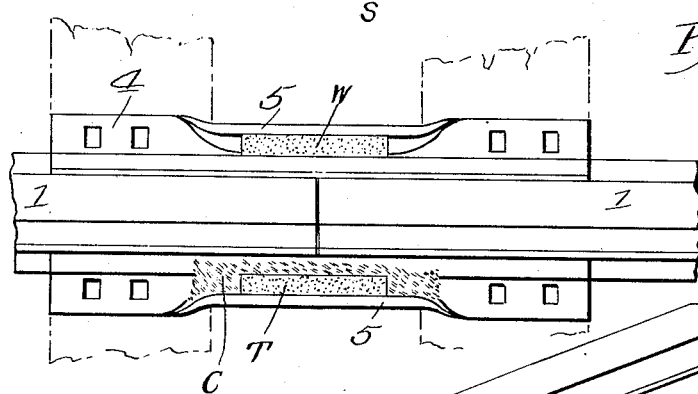
Fig. 2 is a plan view thereof.
Figure 3:
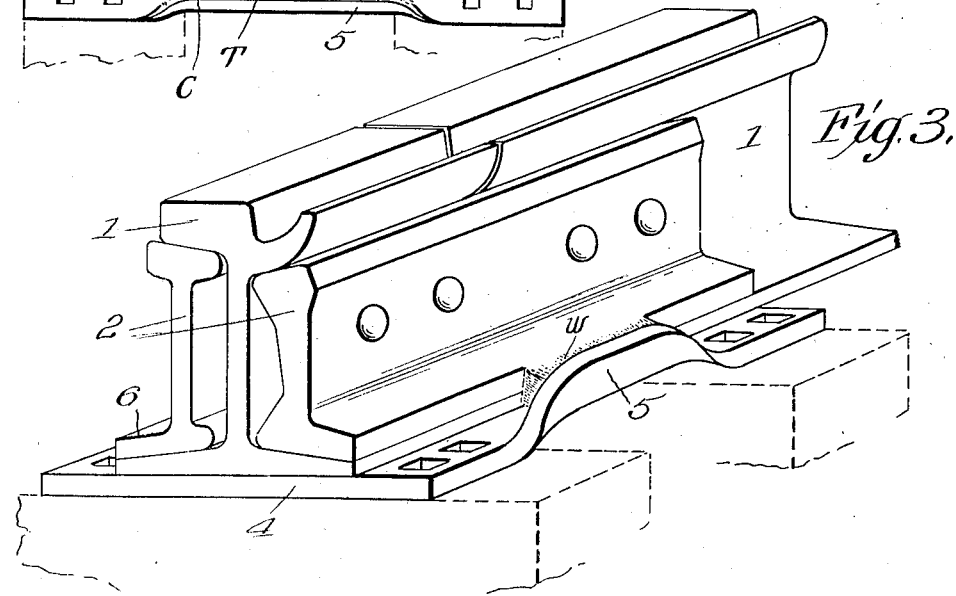
Fig. 3 is a perspective view showing the completed rail joint.

In Fig. 4 there is shown the combustible mixture moulded to rod form and formed with an aperture or opening 8 to receive the ignition powder or cartridge.

Having described my invention, I claim:

1. The herein described process of seam welding rail joints, which consists in placing powdered ferrous material in contact with the surfaces to be welded, placing a combustible mixture comprising aluminum and iron oxide in position, superimposed upon the ferrous material and igniting the combustible mixture whereby the chemical reaction will supply the heat for fusion and reduce a ferrous addition to the weld.

2. The herein described process for seam welding rail joints, which consists in moulding a combustible mixture comprising aluminum and iron oxide and a suitable binder to form a solidified rod, placing powdered ferrous material in contact with the surfaces to be welded, superimposing the rod upon the ferrous material and igniting the rod whereby the chemical reaction will supply the heat for fusion and reduce a ferrous addition to the weld.

3. The herein described process for seam welding which consists in moulding a mixture of aluminum and iron oxide with a sodium silicate binder to form a combustible rod of uniform cross-section, supporting the parts to be welded in the desired relation, placing the combustible rod in close proximity to the desired line of weld with steel filings interposed between the rod and the weld and igniting the combustible rod to supply the heat for fusion and to effect the reduction of additional metal to the weld.

4. The herein described method of securing splice bars of rail joints which consists in positioning a base plate underlying the rail ends and of a form to provide a welding channel in connection with the surfaces to be welded, placing a combustible mixture of aluminum and iron oxide within the channel with ferrous material interposed between the combustible mixture and the surfaces to be welded and igniting the combustible mixture to supply the heat for fusion and to effect a reduction of metallic addition to the weld.

5. The herein described process of seam welding rail joints and the like, which consists in placing a combustible mixture comprising aluminum and iron oxide in close proximity to the surfaces to be welded and with ferrous material interposed between the combustible mixture and said surfaces for displacement of the slag and igniting the combustible mixture whereby the chemical reaction will supply the heat for fusion and reduce a ferrous addition to the weld.

Signed at New York city in the county of New York and State of New York this 30th day of April A. D. 1925.

JOHN ROSCOE MILLWARD.